US011368259B2

(12) United States Patent
Zhou et al.

(10) Patent No.: US 11,368,259 B2
(45) Date of Patent: Jun. 21, 2022

(54) XCARRIER VIRTUAL SINGLE CELL OPERATION

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Mostafa Khoshnevisan, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/911,022

(22) Filed: Jun. 24, 2020

(65) Prior Publication Data

US 2021/0006366 A1    Jan. 7, 2021

Related U.S. Application Data

(60) Provisional application No. 62/872,112, filed on Jul. 9, 2019, provisional application No. 62/871,125, filed on Jul. 6, 2019.

(51) Int. Cl.
| | |
|---|---|
| *H04L 1/18* | (2006.01) |
| *H04W 72/04* | (2009.01) |
| *H04L 5/00* | (2006.01) |
| *H04W 16/28* | (2009.01) |
| *H04W 80/02* | (2009.01) |

(Continued)

(52) U.S. Cl.
CPC .......... *H04L 1/1845* (2013.01); *H04L 1/1819* (2013.01); *H04L 5/0092* (2013.01); *H04W 16/28* (2013.01); *H04W 72/042* (2013.01); *H04W 72/0453* (2013.01); *H04W 72/0493* (2013.01); *H04W 76/11* (2018.02); *H04W 76/27* (2018.02); *H04W 80/02* (2013.01); *H04L 5/001* (2013.01)

(58) Field of Classification Search
CPC ... H04L 1/1845; H04L 5/0092; H04L 1/1819; H04L 5/001; H04L 1/1887; H04L 1/189; H04L 5/0044; H04L 5/0053; H04W 72/0453; H04W 16/28; H04W 72/042; H04W 80/02; H04W 76/27; H04W 76/11; H04W 72/0493; H04B 7/0695
See application file for complete search history.

(56) References Cited

U.S. PATENT DOCUMENTS

| | | | | |
|---|---|---|---|---|
| 2015/0373694 | A1* | 12/2015 | You | H04L 5/0048 370/329 |
| 2017/0063513 | A1* | 3/2017 | Nammi | H04L 1/1829 |
| 2017/0311217 | A1* | 10/2017 | Jung | H04W 36/00835 |

(Continued)

OTHER PUBLICATIONS

International Search Report and Written Opinion—PCT/US2020/039622—ISA/EPO—dated Sep. 11, 2020.

*Primary Examiner* — Afshawn M Towfighi
(74) *Attorney, Agent, or Firm* — Norton Rose Fullbright US LLP

(57) ABSTRACT

Cross-carrier operation control is disclosed. In a particular implementation, a method of wireless communication includes receiving, by a user equipment (UE), a channel via each entity of a plurality of entities. The method also includes combining, for the UE, the channel across the plurality of entities to generate a combined signal for decoding.

30 Claims, 10 Drawing Sheets

(51) Int. Cl.
*H04W 76/27* (2018.01)
*H04W 76/11* (2018.01)

(56) References Cited

U.S. PATENT DOCUMENTS

| | | | | |
|---|---|---|---|---|
| 2017/0339660 | A1* | 11/2017 | Kazmi | H04W 64/003 |
| 2019/0045533 | A1* | 2/2019 | Chatterjee | H04W 72/0446 |
| 2019/0260559 | A1* | 8/2019 | Wu | H04L 1/1835 |
| 2019/0306867 | A1* | 10/2019 | Cirik | H04W 72/005 |
| 2019/0349983 | A1* | 11/2019 | Loehr | H04W 52/365 |
| 2020/0313729 | A1* | 10/2020 | Zhou | H04W 72/046 |
| 2020/0351729 | A1* | 11/2020 | Rastegardoost | H04W 36/0072 |

* cited by examiner

XCARRIER VIRTUAL SINGLE CELL OPERATION

CROSS-REFERENCE TO RELATED APPLICATIONS

This application claims the benefit of U.S. Provisional Patent Application No. 62/872,112, entitled, "XCARRIER VIRTUAL SINGLE CELL OPERATION," filed on Jul. 9, 2019, and also the benefit of U.S. Provisional Patent Application No. 62/871,125, entitled, "XCARRIER VIRTUAL SINGLE CELL OPERATION," filed on Jul. 6, 2019, both of which are expressly incorporated by reference herein in their entirety.

BACKGROUND

Field

Aspects of the present disclosure relate generally to wireless communication systems, and more particularly, cross-carrier operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Conventionally, scheduling of component carries (CCs) is per-CC based scheduling in which each CC is scheduled individually. Such an approach may not be the most robust or reliable approach to convey data, such as data conveyed on Frequency Range 2 (FR2) for 5G NR, which includes frequency bands from 24.25 GHz to 52.6 GHz in mm-Wave. To illustrate, if PDCCH fails on a particular CC, the energy of a corresponding PDSCH on the particular CC is wasted. Additionally, if PDCCH/PDSCH has same content across multiple CCs, a user equipment (UE) is not aware and does not combine them. Further, even if PDSCHs have same content across multiple CCs, each PUCCH carries individual A/N (ACK/NACK) for each PDSCH occasion across the CCs. As a result, conventional techniques of per-CC based scheduling may use multiple cycles to transmit and confirm receipt of relatively small amounts of data, such as data conveyed on FR2. Accordingly, conventional techniques of per-CC based scheduling may be deficient.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a user equipment (UE), a channel via each entity of a plurality of entities. The method also includes combining, for the UE, the channel across the plurality of entities to generate a combined signal for decoding.

In an additional aspect of the disclosure, an apparatus configured for wireless communication includes means for receiving, by a user equipment (UE), a channel via each entity of a plurality of entities; and means for combining the channel across the plurality of entities to generate a combined signal for decoding.

In an additional aspect of the disclosure, a non-transitory computer-readable medium having program code recorded thereon. The program code includes code to receive, by a user equipment (UE), a channel via each entity of a plurality of entities; and combine the channel across the plurality of entities to generate a combined signal for decoding.

In an additional aspect of the disclosure, an apparatus configured for wireless communication is disclosed. The apparatus includes at least one processor, and a memory coupled to the processor. The processor is configured to receive, by a user equipment (UE), a channel via each entity of a plurality of entities; and combine the channel across the plurality of entities to generate a combined signal for decoding.

In an additional aspect of the disclosure, a method of wireless communication includes transmitting, by a base station, a first channel via each entity of a plurality of entities. The method further includes receiving, by the base station, a second channel via at least one entity; and performing decoding based on the received second channel.

In an additional aspect of the disclosure, an apparatus configured for wireless communication includes means for transmitting, by a base station, a first channel via each entity of a plurality of entities; means for receiving, by the base station, a second channel via at least one entity; and means for performing decoding based on the received second channel.

In an additional aspect of the disclosure, a non-transitory computer-readable medium having program code recorded thereon. The program code includes code to transmit, by a base station, a first channel via each entity of a plurality of entities; receive, by the base station, a second channel via at least one entity; and perform decoding based on the received second channel.

In an additional aspect of the disclosure, an apparatus configured for wireless communication is disclosed. The apparatus includes at least one processor, and a memory coupled to the processor. The processor is configured to transmit, by a base station, a first channel via each entity of a plurality of entities; receive, by the base station, a second channel via at least one entity; and perform decoding based on the received second channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
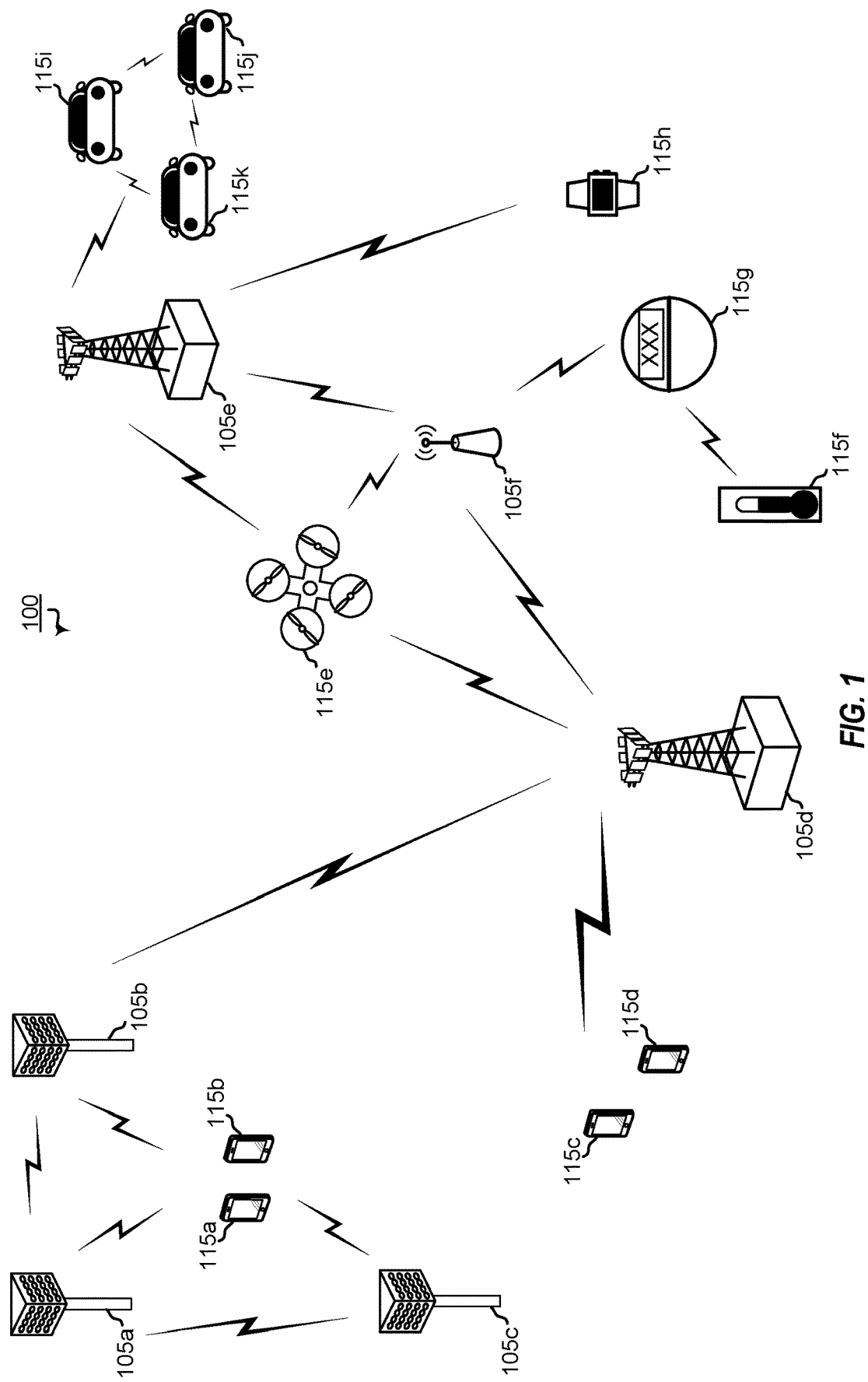
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

In some implementations, the described techniques relate to improved methods, systems, devices, and apparatuses for communicating a channel across multiple entities of a plurality of entities. For example, each entity may include a component carrier, a cell, or a frequency allocation. Each entity may have a configuration. The configuration may include bandwidth (BW), bandwidth parts (BWP)s, HARQ processes, transmission configuration indicator (TCI) states, reference signals (RS)s, control and data channel resources, or a combination thereof. The channel may include Physical Downlink Control Channel (PDCCH), Physical Downlink Shared Channel (PDSCH), Physical Uplink Control Channel (PUCCH), or Physical Uplink Shared Channel (PUSCH), as illustrative, non-limiting examples.

In some implementations, the channel includes Physical Downlink Control Channel (PDCCH). In some implementations, another channel is scheduled for transmission over the plurality of entities. The other channel may include Physical Downlink Shared Channel (PDSCH), Physical Uplink Control Channel (PUCCH), or Physical Uplink Shared Channel (PUSCH), as illustrative, non-limiting examples. The scheduled channel on each entity can be jointly encoded over the plurality of entities or individually encoded b the entity itself.

In some implementations, each entity of the plurality of entities may correspond to a common cell identity (ID), a common bandwidth part (BWP) ID, or both. For example, a medium access control-control element (MAC-CE), a radio resource control (RRC), or a downlink control information (DCI) includes the common cell ID, the common BWP ID, or both. The common cell ID may include a virtual cell ID or a cell ID corresponding to one entity of the plurality of entities.

In some implementations, the channel of each entity of the plurality of entities has the same configuration. The channel of each entity of the plurality of entities may carry the same configuration. In some implementation, the channel of each entity of the plurality of entities carries the same content.

The entities may have identical management functionalities, such as active bandwidth part (BWP) switching, and beam management. Additionally, or alternatively, the entities may have identical active bandwidth part (BWP) identities (IDs), and transmit (Tx)/receive (Rx) beams.

In some implementations, at least two entities of the plurality of entities have different configurations. In some examples, the channels of at least two entities of the plurality of entities have different configurations. In other implementations, the channel of each entity of the plurality of entities carries a jointly encoded content.

In some implementations, at least two entities have independent management functionalities, such as active bandwidth part (BWP) switching, and beam management. Additionally, or alternatively, the entities have identical active bandwidth part (BWP) identities (IDs), and transmit (Tx)/receive (Rx) beams.

In some implementations, the described techniques relate to improved methods, systems, devices, and apparatuses for using and scheduling CCs, such as CCs corresponding to frequency range (e.g., frequency range 2 (FR2) in 5G). For example, if multiple CCs have the same QCL, the multiple CCS may be assigned to a particular symbol to one UE. In such implementations, CCs with the same QCL can be configured with xCarrier repetition, such as xCarrier virtual signal cell repetition. In such implementations, the same DL/UL transmission can be duplicated over multiple CCS. Additionally, the UE can combine the multiple CCs for additional energy and/or against CC specific interference. For example, such interference may be present or result from different CCs among different UEs or other network communications. As compared to conventional techniques of per-CC based scheduling, the present techniques provide for PDSCH to be combined over multiple CCs. If PDCCH is coded, PDSCH over multiple CCs can also be utilized. Additionally, as compared to conventional techniques of per-CC based scheduling, the present techniques provide for PUCCH to carry common A/N for multiple PDSCH repetitions and/or can be xCarrier duplicated for the base station (e.g., gNB) to combine. Accordingly, as compared to conventional techniques of per-CC based scheduling, the present techniques provide at least reduced UE complexity and/or single decoding across multiple CCs.

This disclosure relates generally to providing or participating in authorized shared access between two or more wireless communications systems, also referred to as wireless communications networks. The techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks (sometimes referred to as "5G NR" networks/systems/devices), as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating details of a wireless communication system. For example, the wireless communication system 100 may be or include a 5G network including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
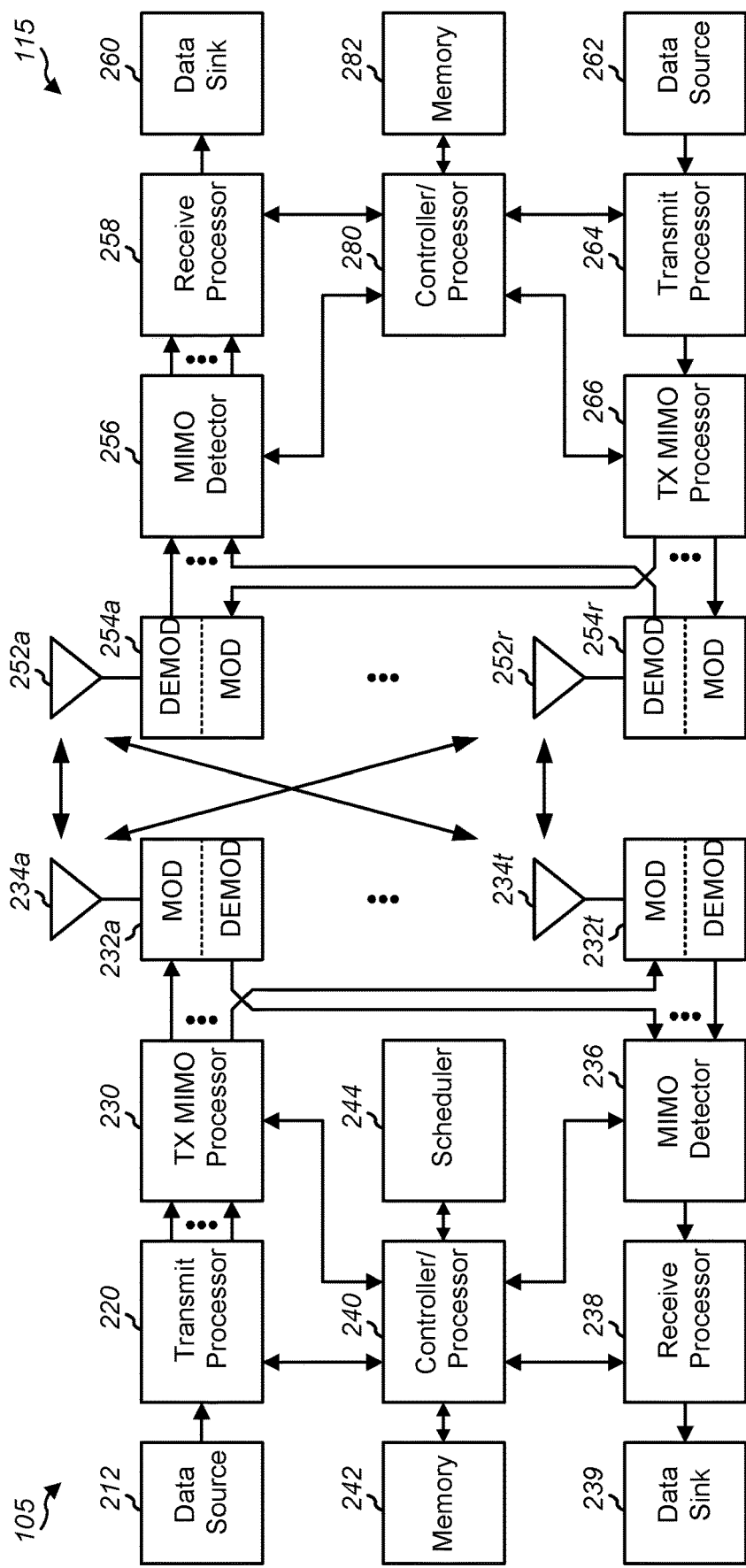
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein, such as perform or direct the execution of the function blocks illustrated in FIGS. 11-13. The controllers/processor 280 and/or other processors and modules at the UE 115 may also perform or direct the execution of the functional blocks illustrated in FIGS. 8-10, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
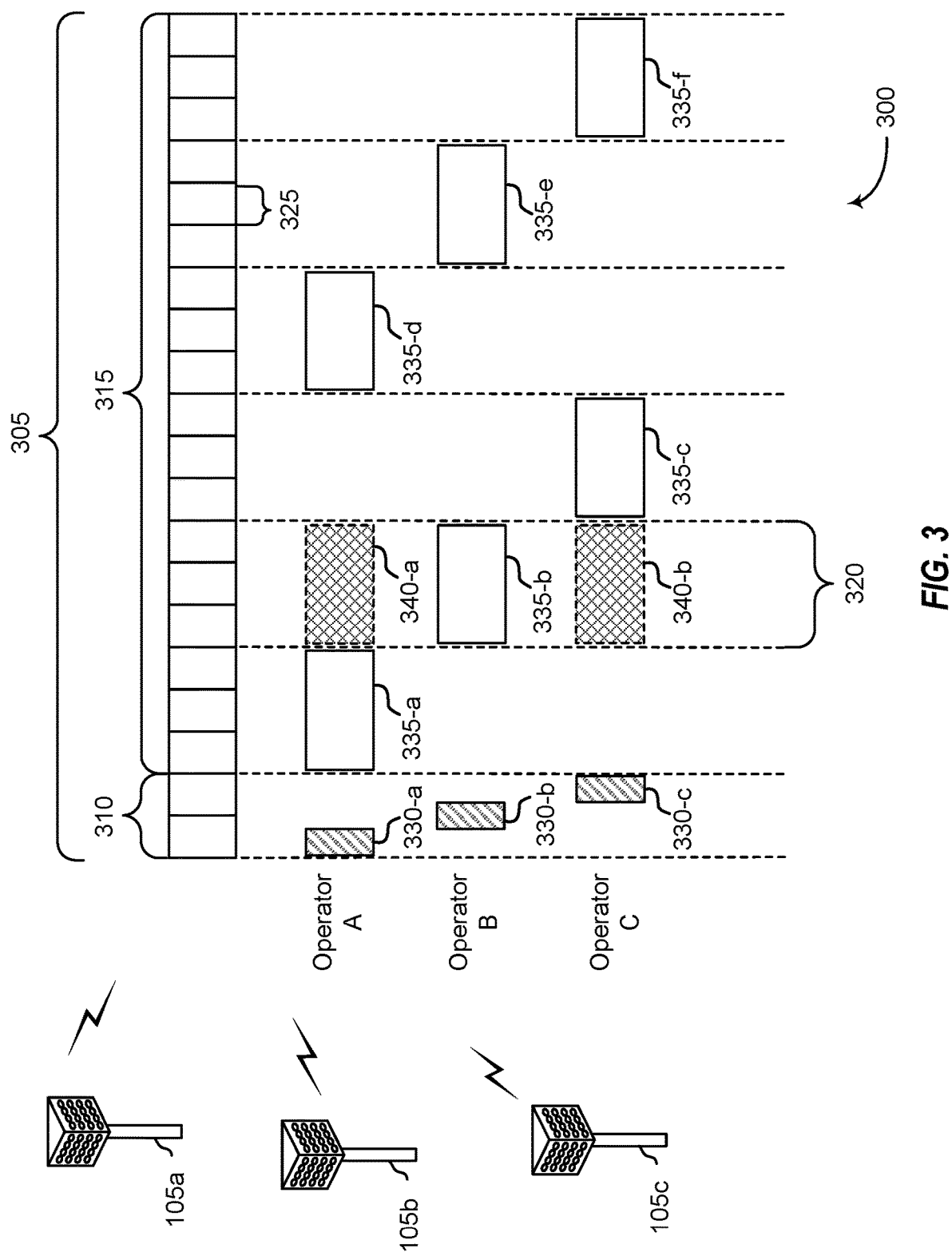
FIG. 3 is a diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some aspects, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
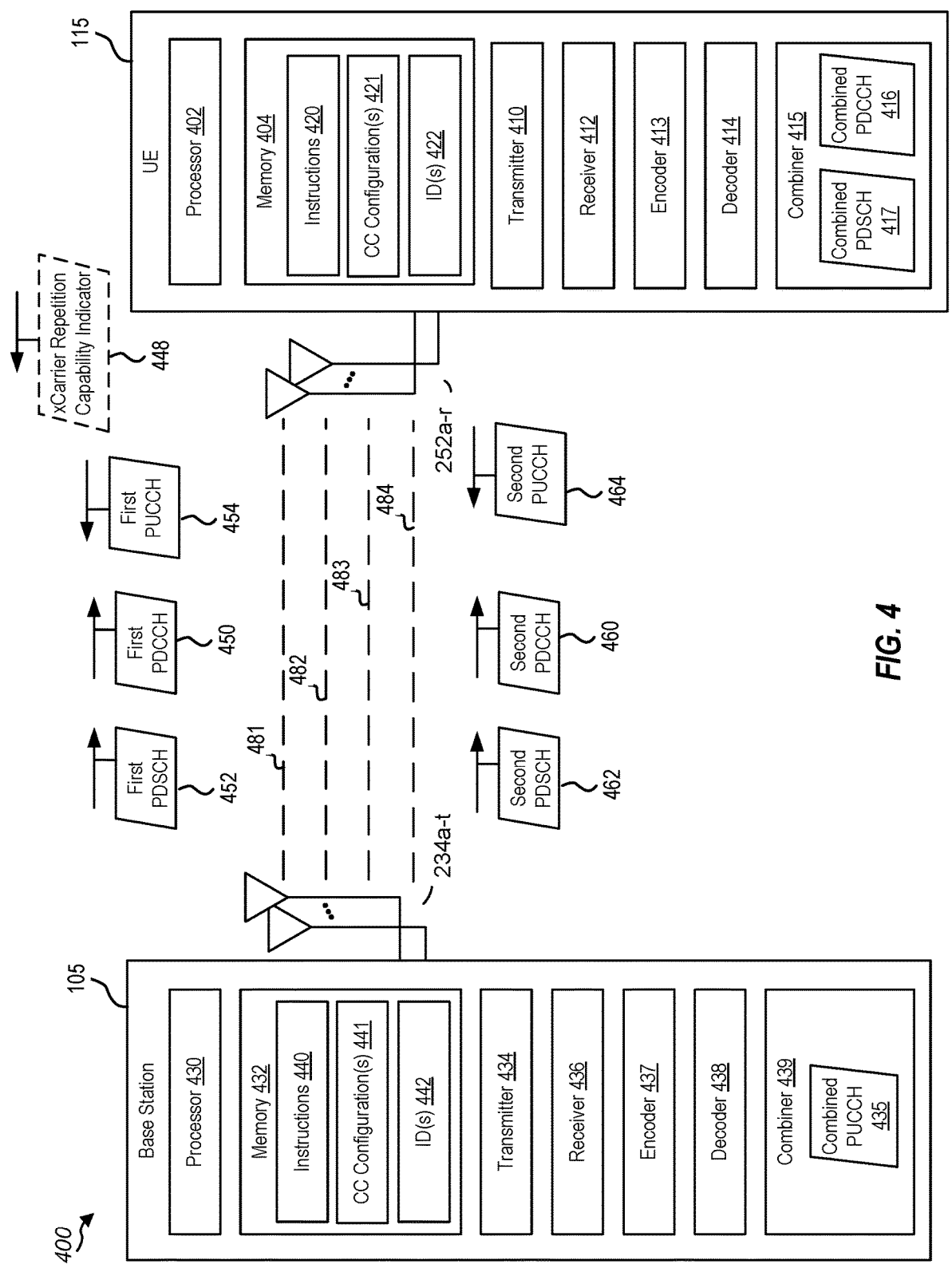
FIG. 4 is a diagram illustrating a wireless communication system including a base station and a UE.

FIG. 4 illustrates an example of a wireless communications system 400 including base station 105 and UE 115. The wireless communication system 400 supports cross-carrier operation, such as cross-carrier single cell operation control, in accordance with aspects of the present disclosure. In some examples, wireless communications system 400 may implement aspects of wireless communication system 100. Base station 105 and UE 115 and base station 105 may be configured to communicate via one or more access links, such as a representative first access link 480 and a representative second access link 482.

Base station 105 and UE 115 may be configured to communicate via frequency bands, such as FR1 having a frequency of 450 to 6000 MHz for Sub-6 GHz or FR2 having a frequency of 24250 to 2600 MHz for mm-Wave, as illustrative, non-limiting examples. It is noted that sub-carrier spacing (SCS) may be equal to 15, 30, 60, or 120 kHz, or other value, for some data channel. Base station 105 and UE 115 may be configured to communicate via one or more component carriers (CCs), such as representative first CC 481, second CC 482, third CC 483, and fourth CC 484. Although four CCs are shown, this is for illustration only, and more or fewer than four CCs may be used. One or more CCs may be used to communicate Physical Downlink Control Channel (PDCCH), Physical Downlink Shared Channel (PDSCH), Physical Uplink Control Channel (PUCCH), or Physical Uplink Shared Channel (PUSCH).

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both.

In some implementations, two or more CCs are quasi co-located, such that the CCs may have the same beam and/or same symbol. Additionally, or alternatively, CCs may be grouped as a set of one or more CCs, such as a xCarrier coreset. Each CC in a coreset may have the same cell ID, the same HARQ ID, or both.

In some implementations, control information may be communicated via base station 105 and UE 115. For example, the control information may be communicated using MAC-CE transmissions, RRC transmissions, DCI, transmissions, another transmission, or a combination thereof.

As described herein, UE 115 may be configured and/or capable to operate in a cross carrier repetition mode as a single virtual cell. In some implementations, UE 115 may communicate a message (e.g., 448) indicating that UE 115 is configured for cross carrier repetition as a single virtual cell. To illustrate, UE 115 may operate in a first mode in a first cycle, and may operate in a second mode, different from the first mode, in another cycle. As an illustrative, non-limiting example, the first mode includes a common CC configuration mode and the second mode includes a unique CC configuration mode.

Base station 105 includes processor 430, memory 432, transmitter 434, receiver 436, an encoder 437, decoder 438, combiner 439, and antennas 234*a-t*. Processor 430 may be configured to execute instructions 440 stored at memory 432 to perform the operations described herein. In some implementations, processor 430 includes or corresponds to controller/processor 240, and memory 432 includes or corresponds to memory 242. Memory 432 may also be configured to store one or more CC configurations 441, one or more IDs values 442, or both, as further described herein. The one or more CC configurations 441 may be bandwidth, bandwidth part, HARQ process, TCI state, RS, control channel resources, data channel resources, or a combination thereof. The one or more IDs 442 may be a common Cell ID (e.g., a virtual Cell ID or a particular Cell ID of a particular CC of the plurality of CCs) or a common Bandwidth Part (BWP) ID.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2. In some implementations, transmitter 434, receiver, 436, or both may be included in one more wireless radios, as described with reference to FIG. 11.

Encoder 437 and decoder 438 may be configured to encode and decode, such as jointly encoding and jointly decoding, respectively. Combiner 439 may be configured to combine xCarrier data to generate combined data, such as combined data for decoding.

UE 115 includes processor 402, memory 404, transmitter 410, receiver 412, an encoder 413, decoder 414, combiner 415, and antennas 252*a-r*. Processor 402 may be configured to execute instructions 420 stored at memory 404 to perform the operations described herein. In some implementations, processor 402 includes or corresponds to controller/processor 280, and memory 404 includes or corresponds to memory 282. Memory 432 may also be configured to store one or more CC configurations 421, one or more IDs values 422, or both, as further described herein. The one or more CC configurations 421 may be bandwidth, bandwidth part, HARQ process, TCI state, RS, control channel resources, data channel resources, or a combination thereof. The one or more IDs 422 may be a common Cell ID (e.g., a virtual Cell ID or a particular Cell ID of a particular CC of the plurality of CCs) or a common Bandwidth Part (BWP) ID. The configurations 421 and ID(s) 422 may correspond to configurations 41 and ID(s) 442, respectively.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2. In some implementations, transmitter 410, receiver, 412, or both may be included in one more wireless radios, as described with reference to FIG. 10.

Encoder 413, decoder 414, and combiner 415 may include the same functionality as described with reference to encoder 437, decoder 438, and combiner 439, respectively.

During operation of wireless communications system 400, base station 105 may determine that UE has xCarrier repetition capability. For example, base station 105 may receive message 448 that includes a xCarrier repetition capability indicator. Base station 105 may identify two or more CCs with the same QCL and may configure the two or more CCs for xCarrier repetition as a single virtual cell. In some implementations, base station 105 sends control information to indicate to UE 115 that xCarrier reputation is to be used.

Base station 105 may jointly encode PDCCH to be transmitted via multiple CCs—e.g., xCarrier repetition. For example, base station 105 may transmit first PDCCH 450 via first CC 481 and may transmit second PDCCH 460 via second CC 482. Additionally, base station 105 may jointly encode PDSCH to be transmitted via multiple CCs—e.g., xCarrier repetition. For example, base station 105 may transmit first PDSCH 452 via first CC 481 and may transmit second PDSCH 462 via second CC 482.

UE 115 receives the multiple PDCCH (e.g., 450, 460) and generates a combined PDCCH 416 based on the multiple PDCCH. For example, combiner 416 may be configured to combine energies of the multiple PDCCH to generate combined PDCCH 416. Decoder 414 may decode the combined PDCCH 416. Additionally, UE 115 receives the multiple PDSCH (e.g., 452, 462) corresponding to the multiple PDCCH (e.g., 450, 460) and generates a combined PDSCH 417. For example, combiner 416 may be configured to combine energies of the multiple PDSCH to generate combined PDSCH 417. Decoder 414 may decode the combined PDCCH 417.

Based on the decoding of combined PDCCH 417, UE 115 sends PUCCH to base station 105. For example, UE 115 may use encoder 413 to jointly encode PUCCH into first PUCCH 454 and second PUCCH 464 which are sent to base station 105. To illustrate, first PUCCH 454 may be sent via first CC 481 and second PUCCH 464 may be sent via second CC 482.

It is noted that PUCCH may include or correspond to an acknowledgment message, such as an ACK/NACK. UE 115 may send an ACK or a NACK based on a determination of whether combined PUSCH was successfully decoded. To illustrate, the ACK is communicated if decoding is successful and the NACK is communicated if decoding is unsuccessful.

Base station 105 receives the multiple PUCCH (e.g., 454, 464) and generates a combined PUCCH 4345 based on the multiple PUCCH. For example, combiner 439 may be configured to combine energies of the multiple PUCCH to generate combined PUCCH 435. Decoder 438 may decode the combined PUCCH 435.

Figure 5:
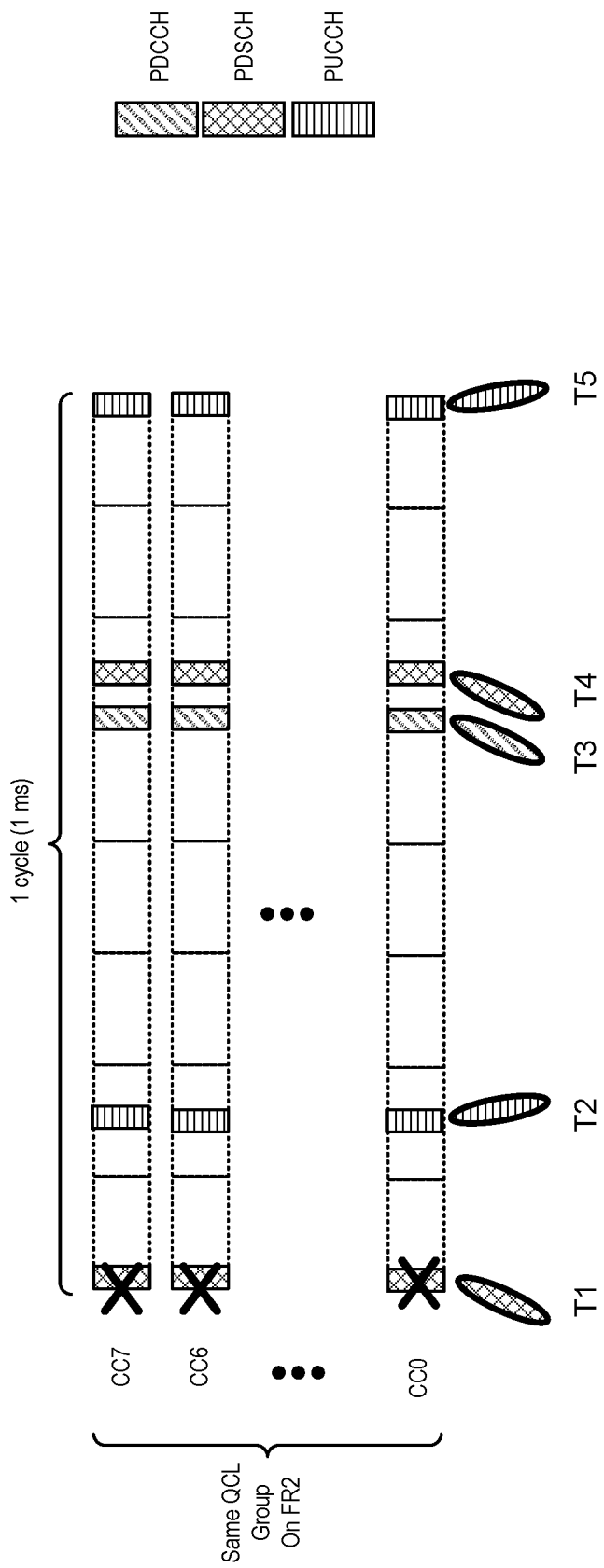
FIG. 5 is a diagram illustrating a wireless communication between a base station and a UE.
Figure 6:
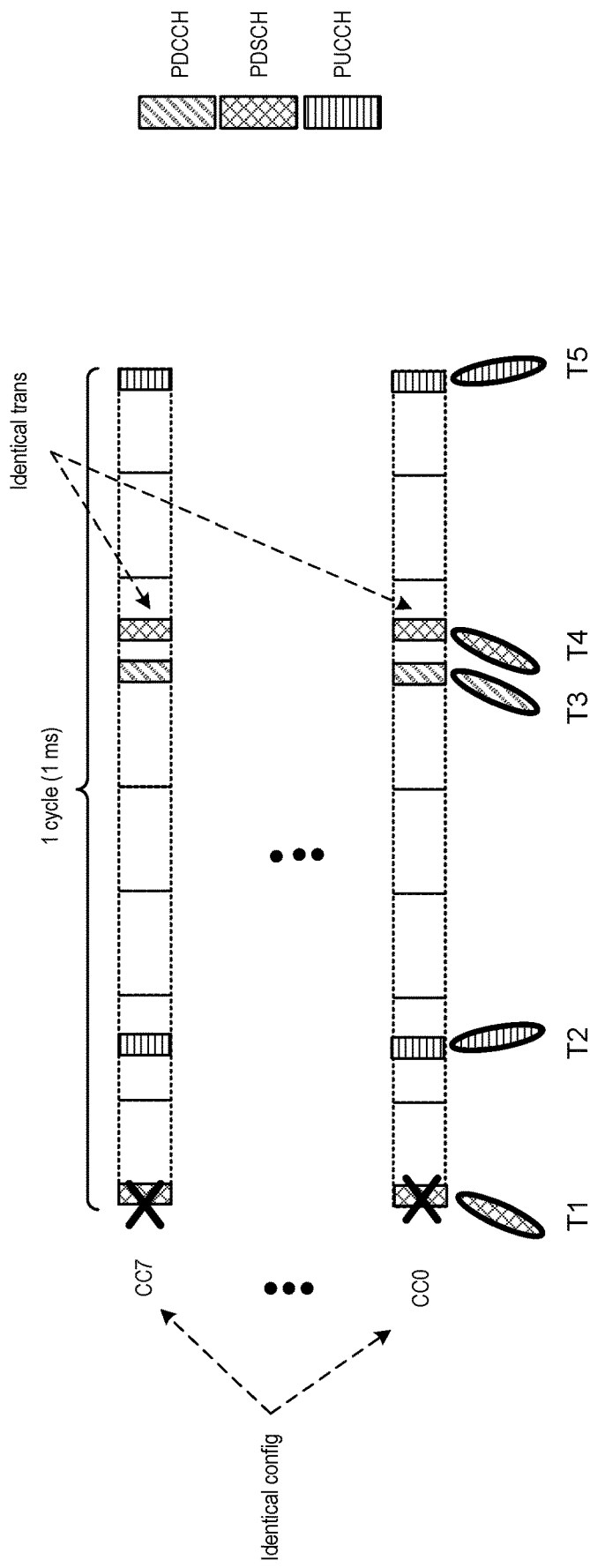
FIG. 6 is a diagram illustrating a wireless communication between a base station and a UE.
Figure 7:
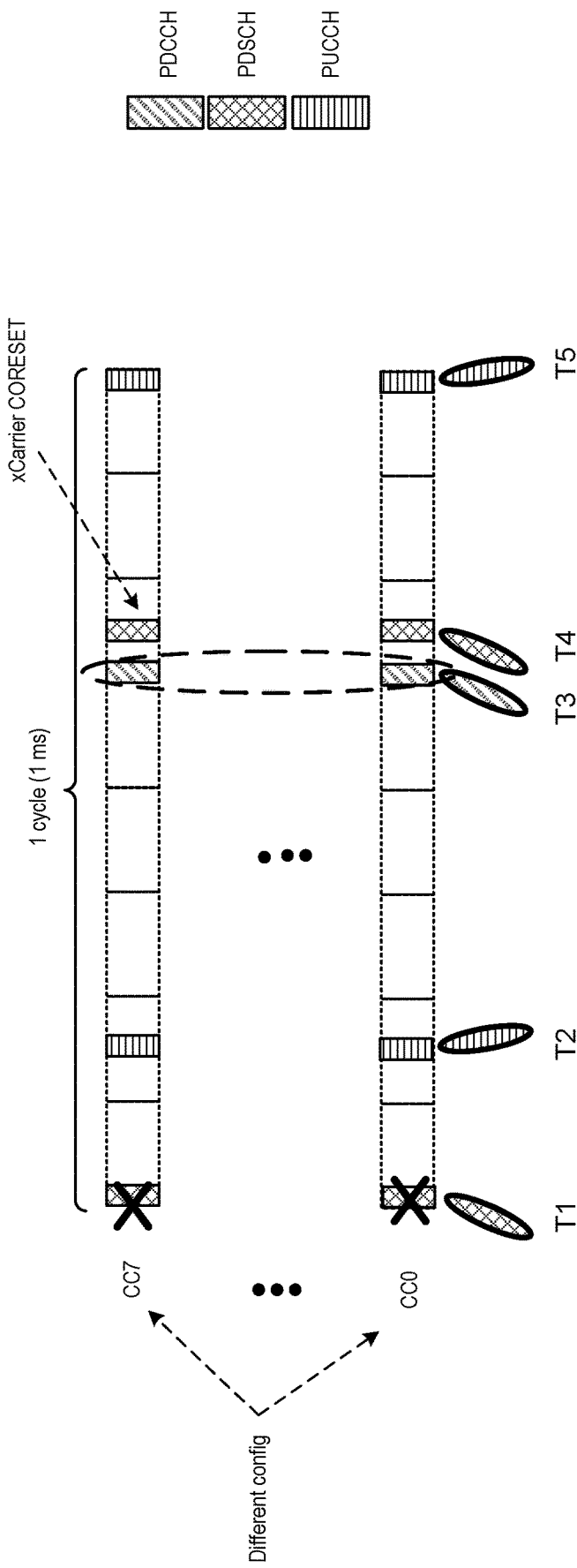
FIG. 7 is a diagram illustrating a wireless communication between a base station and a UE.

Operations of FIG. 4 are described further herein with reference to FIGS. 5-7. FIGS. 5-7 include examples of wireless communication between base station 105 and UE 115. For example, one or more of FIGS. 5-7 show xCarrier virtual single cell operation. Each of FIGS. 5-7 show multiple CCs over an illustrative cycle, such as a 1 ms cycle, as an illustrative, non-limiting example. Each of FIGS. 5-7 shows one or more transmissions via the CCs. The at least one transmission may include or correspond to a channel, such as Physical Downlink Control Channel (PDCCH), Physical Downlink Shared Channel (PDSCH), Physical Uplink Control Channel (PUCCH), Physical Uplink Shared Channel (PUSCH), or Physical Random Access Channel (PRACH), as illustrative, non-limiting examples. In FIGS. 5-7, an "X" indicates a blocked transmission and elongated ovals indicate different beams.

Referring to FIG. 5, a general example of xCarrier virtual single cell operation is shown. As indicated in FIG. 5, two or more CCs with same QCL can be configured with xCarrier repetition virtually as a single cell. When configured for xCarrier repetition virtually as a single cell, the same DL/UL transmissions can be duplicated over multiple CCs. The UE 115 can combine the multiple CCs for additional energy or to compensate for CC specific interference, e.g. due to different CCs among UEs, or other networks.

As shown in FIG. 5, CCs CC0-CC7 are identified as having the same QCL group on FR2. When configured to xCarrier repetition, the same DL/UL transmission can be duplicated over CCs. For example, at T1, PDSCH is duplicated on multiple CCs and are blocked as indicated by the "X". At time T2, PUCCH (e.g., a NACK) is duplicated on the multiple CCs. At T3 and T4, PDCCH and PDSCH are duplicated on multiple CCs, respectively. At T5, PUCCH (e.g., an ACK) is duplicated on multiple CCs.

As compared with per-CC scheduling, PDCCH can be combined over multiple CCs. If PDCCH is decoded, PDSCH over the multiple CCs can be utilized as well. PUCCH can carry a common A/N based on the multiple PDSCH repetitions, and can be xCarrier duplicated for gNB combining. Accordingly, xCarrier repetition described herein can reduce UE complexity with single decoding across multiple CCs. Example operation modes for xCarrier Virtual Single Cell Operation are described with reference to FIGS. 6 and 7.

Referring to FIG. 6, an example of xCarrier Virtual Single Cell Operation is shown. The xCarrier virtual single cell operation can be signaled by base station 105 based on application scenario and/or can be determined or indicated based on UE capability.

In a first operation mode, e.g., operation mode 1, each CC of a set of CCs can have the same configuration. For example, each CC has a configuration that includes the same BW, BWPs, HARQ processes, TCI states, RSs, control/data channel resources. For the first operation mode, DL/UL trans can be the same across CCs the set of CCs, and common Cell ID & BWP ID can be used in MAC-CE/RRC/DCI. For example, base station 105 may use a DCI to indicate a common cell ID and BWP ID. The common cell ID can be a virtual cell ID or one of the CC cell IDs. In such implementations, each of the multiple CCs have identical active BWP ID with synchronized active BWP switch.

In one aspect of the disclosure, a method of wireless communication includes receiving, by a user equipment (UE) during a particular cycle, a first Physical Downlink Control Channel (PDCCH) via a first component carrier (CC) of a plurality of CCs and a second PDCCH via a second CC of the plurality of CCs. The first CC and the second CC have the same configuration. The method also includes combining, by the UE during the particular cycle, the first PDCCH and the second PDCCH to generate a combined PDCCH. The method further includes receiving, by the UE during the particular cycle, a first Physical Downlink Shared Channel (PDSCH) and a second PDSCH via the plurality of CCs, the first and second PDSCH corresponding to the combined PDCCH.

Referring to FIG. 7, an example of xCarrier Virtual Single Cell Operation is shown. The xCarrier virtual single cell operation can be signaled by base station 105 based on application scenario and/or can be determined or indicated based on UE capability.

In a second operation mode, e.g., operation mode 2, each CC of a set of CCs has a different configuration. To illustrate, each CC can have different configurations, e.g. different BW, BWPs, TCI states. For the second operation mode, the control/data info can be xCarrier jointly encoded, for all or a subset of CCs. PDCCHs can be jointly encoded (e.g., by the base station 105) and spread across per-CC CORESETs, which forms a xCarrier CORESET. Additionally, jointly encoded PDSCH/PUCCH/PUSCH can also be spread across CCs, and can be scheduled by xCarrier or per-CC CORESET. In the second operation mode, different CCs of the set of CCs can have unified virtual Cell ID and HARQ IDs to facilitate HARQ combining. It is noted that in the second operation mode, each CC can have independent management functionalities, e.g. BM, BWP switching.

In an additional aspect of the disclosure, a method of wireless communication includes receiving, by a user equipment (UE), a first Physical Downlink Control Channel (PDCCH) via a first component carrier (CC) of a plurality of CCs and a second PDCCH via a second CC of the plurality of CCs. The first CC and the second CC are included in a first xCarrier CORESET of the plurality of CCs. Each CC included in the first xCarrier CORESET has a different configuration. The method also includes combining, by the UE, the first PDCCH and the second PDCCH to generate a first combined PDCCH. The method further includes receiving, by the UE, a first Physical Downlink Shared Channel (PDSCH) and a second PDSCH via the plurality of CCs, the first and second PDSCH corresponding to the first combined PDCCH.

In some aspects, xCarrier Virtual signal Cell Operation can have a third operation mode—e.g., operation mode 3. For example, UE may be configured to operate in an operation mode 3, which can be considered a hybrid of operation mode 1 and operation mode 2. In operation mode 3, at least two CCs (e.g., a first CC and a second CC) of a set of CCs have the same configuration and at least one CC (e.g., a third CC) has a different configuration. Additionally, jointly encoded PDSCH/PUCCH/PUSCH can also be spread across CCs, and can be scheduled by xCarrier or per-CC CORESET. In the third operation mode, different CCs of the set of CCs can have unified virtual Cell ID and HARQ IDs to facilitate HARQ combining. PDCCHs or PDSCHs received via the first CC, the second CC, and the third CC can be combined to form a combined PDCCH or a combined PDSCH, respectively. It is noted that in the second operation mode, CCs with different configurations can have independent management functionalities, e.g. BM, BWP switching.

In one aspect of the disclosure, a method of wireless communication includes receiving, by a user equipment (UE), a first Physical Downlink Control Channel (PDCCH) via a first component carrier (CC) of a plurality of CCs and a second PDCCH via a second CC of the plurality of CCs. The first CC and the second CC have the same configuration. The method also includes receiving, by the (UE), a third PDCCH via a third CC of the plurality of CCs, the third CC having a different configuration from each of the first CC and the second CC. The method includes combining, by the UE, the first PDCCH, the second PDCCH, and the third PDCCH to generate a combined PDCCH. The method further includes receiving, by the UE, a first Physical Downlink Shared Channel (PDSCH), a second PDSCH, and a third PDSCH via the plurality of CCs, the first and second PDSCH corresponding to the combined PDCCH.

As described with reference to at least FIGS. 4-7, the described techniques relate to improved methods, systems, devices, and apparatuses for communicating a channel across multiple entities of a plurality of entities. For example, each entity may include a component carrier, a cell, or a frequency allocation. Each entity may have a configuration. The configuration may include bandwidth (BW), bandwidth parts (BWP)s, HARQ processes, transmission configuration indicator (TCI) states, reference signals (RS)s, control and data channel resources, or a combination thereof. The channel may include Physical Downlink Control Channel (PDCCH), Physical Downlink Shared Channel (PDSCH), Physical Uplink Control Channel (PUCCH), or Physical Uplink Shared Channel (PUSCH), as illustrative, non-limiting examples.

In some implementations, the channel includes Physical Downlink Control Channel (PDCCH). In some other implementations, another channel is scheduled for transmission over the plurality of entities. The other channel may include Physical Downlink Shared Channel (PDSCH), Physical Uplink Control Channel (PUCCH), or Physical Uplink Shared Channel (PUSCH), as illustrative, non-limiting examples. The scheduled channel on each entity can be jointly encoded over the plurality of entities or individually encoded b the entity itself.

In some implementations, for each entity of the plurality of entities may correspond to a common cell identity (ID), a common bandwidth part (BWP) ID, or both. For example, a medium access control-control element (MAC-CE), a radio resource control (RRC), or a downlink control information (DCI) includes the common cell ID, the common BWP ID, or both. The common cell ID may include a virtual cell ID or a cell ID corresponding to one entity of the plurality of entities.

In some implementations, the channel of each entity of the plurality of entities has the same configuration. The channel of each entity of the plurality of entities may carry the same configuration. In some implementation, the channel of each entity of the plurality of entities carries the same content. In some other implementations, the entities have identical management functionalities, such as active bandwidth part (BWP) switching, and beam management. Additionally, or alternatively, the entities have identical active bandwidth part (BWP) identities (IDs), and transmit (Tx)/receive (Rx) beams.

In some implementations, at least two entities of the plurality of entities have different configurations. In some examples, the channels of at least two entities of the plurality of entities have different configurations. In other implementations, the channel of each entity of the plurality of entities carries a jointly encoded content.

In some implementations, at least two entities have independent management functionalities, such as active bandwidth part (BWP) switching, and beam management. Additionally, or alternatively, the entities have identical active bandwidth part (BWP) identities (IDs), and transmit (Tx)/receive (Rx) beams.

Thus, FIGS. 4-7 describes cross-carrier operations. For example, cross-carrier operation control may be used with mmWave for communication between base station 105 and UE 115. The techniques described herein may enable cross-carrier operation control.

Figure 8:
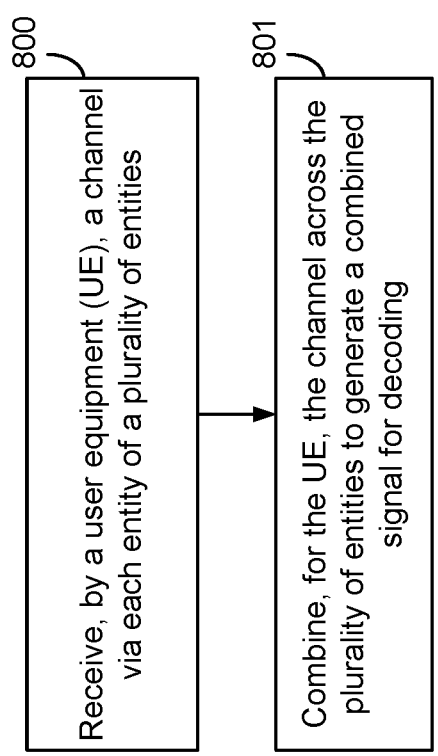
FIG. 8 is a block diagram illustrating example blocks executed by a UE configured according to an aspect of the present disclosure.
Figure 10:
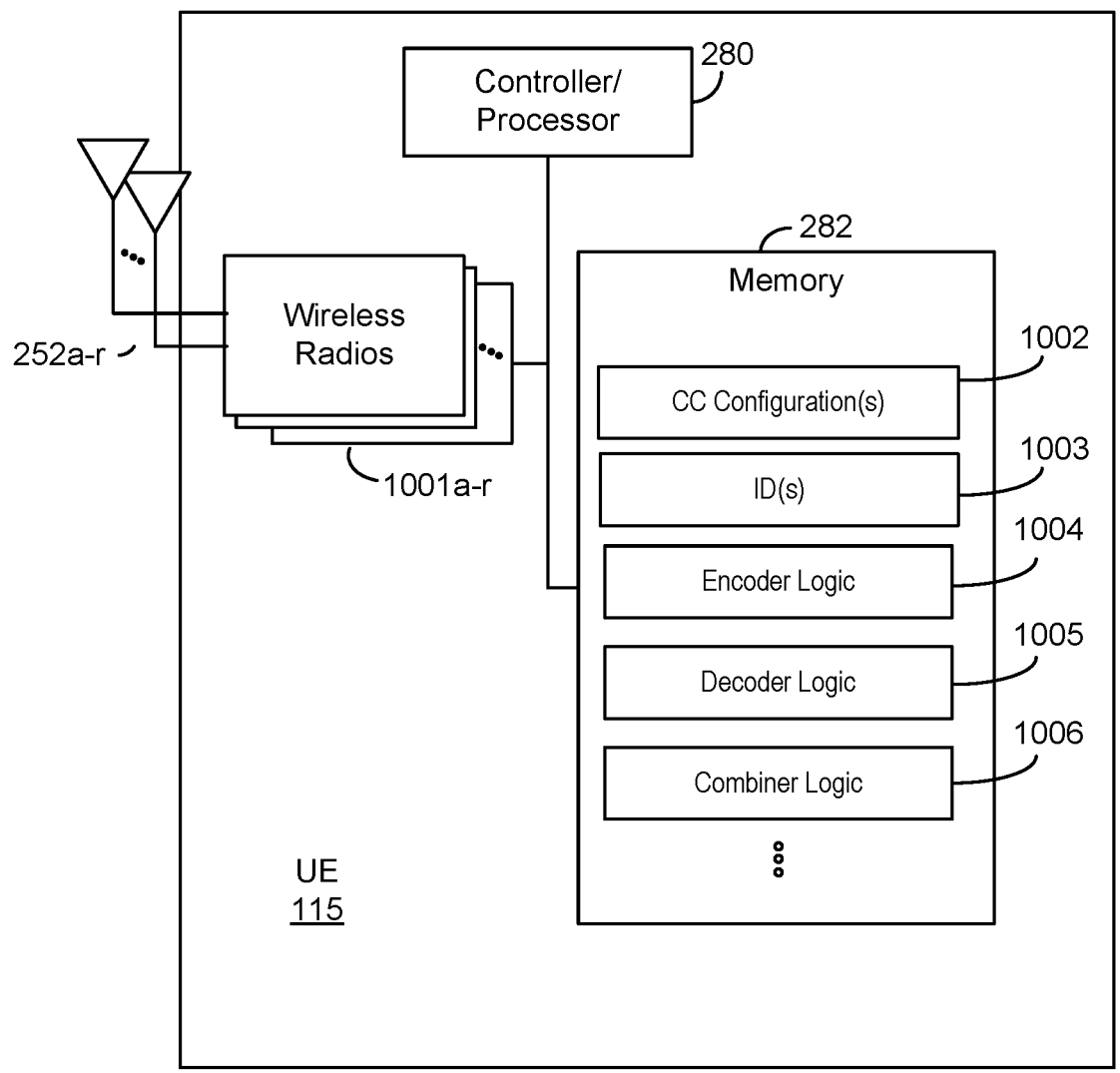
FIG. 10 is a block diagram conceptually illustrating a design of a UE according to some aspects of the present disclosure.
Figure 11:
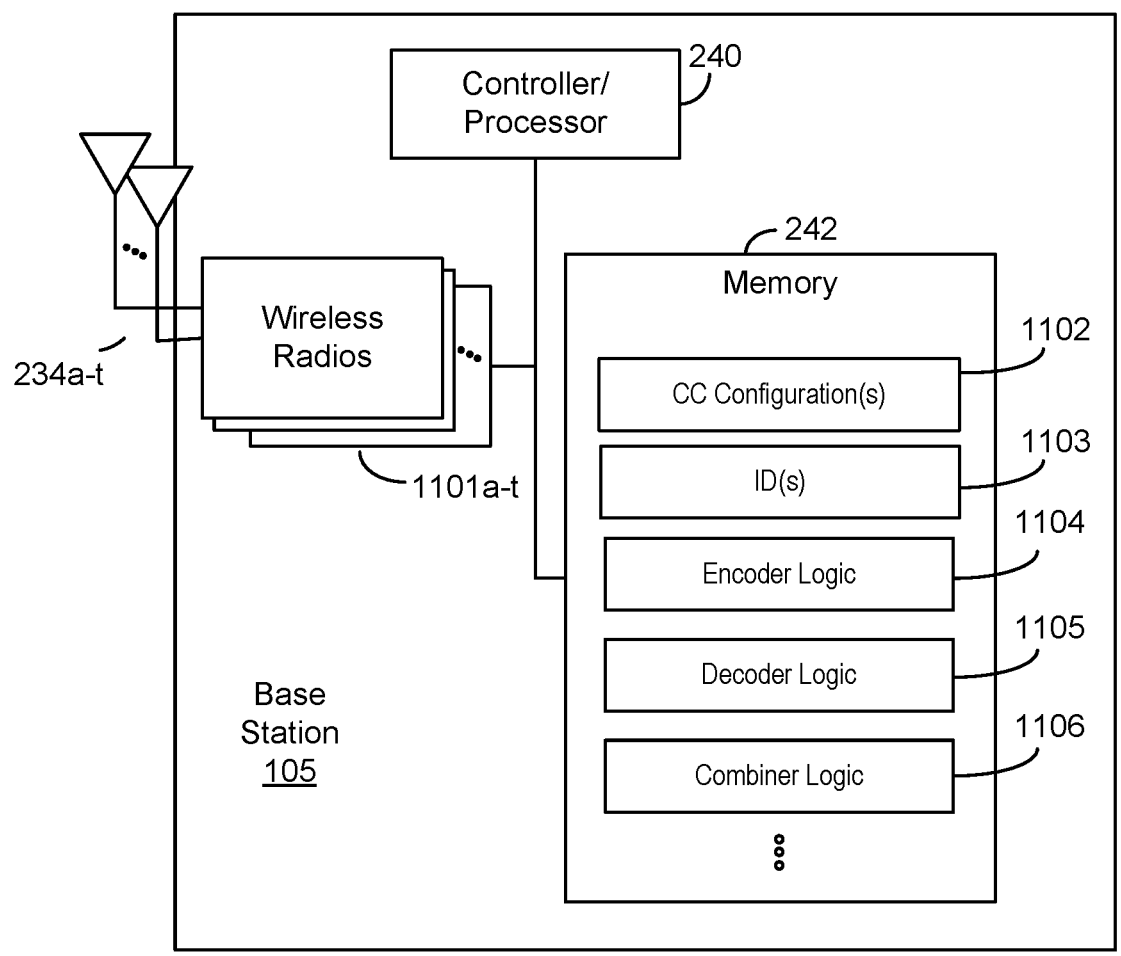
FIG. 11 is a block diagram conceptually illustrating a design of a base station configured according to some aspects of the present disclosure.

FIG. 8 is a block diagram illustrating example blocks executed by a UE configured according to an aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1001*a-r* and antennas 252*a-r*. Wireless radios 1001*a-r* includes various components and hardware, as illustrated in FIG. 2 for UE 115, including modulator/demodulators 254*a-r*, MIMO detector 256, receive processor 258, transmit processor 264, and TX MIMO processor 266. As shown, memory 282 may include one or more CC configurations 1002, one or more IDs 1003, encoder logic 1004, decoder logic 1005, and combination logic 1006. CC configurations 1002 and IDs 1003 may include or correspond to CC configurations 421 and ID(s) 422, respectively. Encoder logic 1004, decoder logic 1005, and combination logic 1006 may include or correspond to encoder 413, decoder 414, and combination 415, respectively. In some aspects, encoder logic 1004, decoder logic 1005, and combination logic 1006 may include or correspond to processor(s) 402. UE 115 may receive signals from and/or transmit signal to a base station, such as base station 105 as illustrated in FIG. 11.

Referring to FIG. 8, at block 800, the UE receives a channel via each entity of a plurality of entities. At block 801, the UE combines the channel across the plurality of entities to generate a combined signal for decoding.

It is noted that one or more blocks (or operations) described with reference to one of FIG. 8 may be combined with one or more blocks (or operations) of another figure. For example, one or more blocks of FIG. 800 may be combined with one or more blocks (or operations) of another of FIG. 2, 4, or 10. Additionally, or alternatively, one or more operations described above with reference to FIGS. 1-7 may be combine with one or more operations described with reference to FIG. 8.

Figure 9:
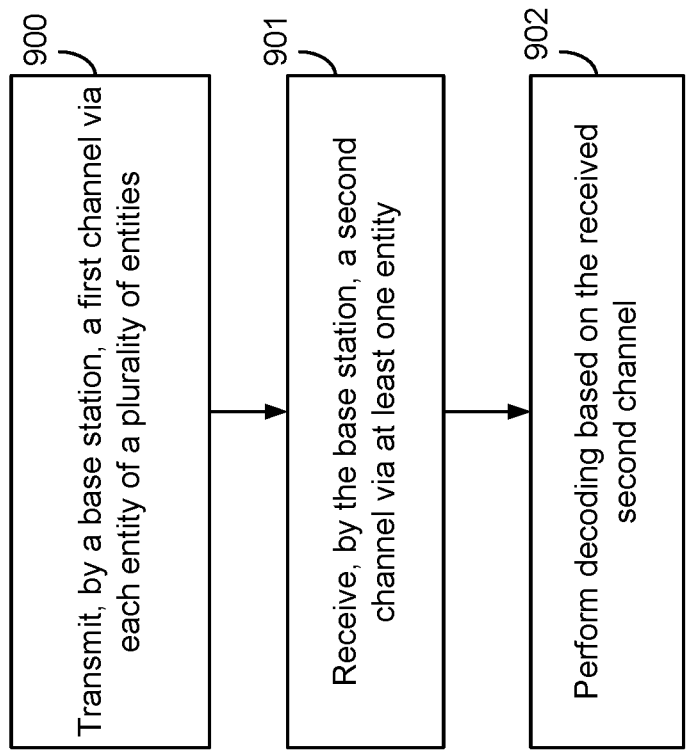
FIG. 9 is a block diagram illustrating example blocks executed by a base station configured according to an aspect of the present disclosure.

FIG. 9 is a block diagrams illustrating example blocks executed by a base station configured according to an aspect of the present disclosure. The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1101*a-t* and antennas 234*a-t*. Wireless radios 1101*a-t* includes various components and hardware, as illustrated in FIG. 2 for base station 105, including modulator/demodulators 232*a-t*, transmit processor 220, TX MIMO processor 230, MIMO detector 236, and receive processor 238. As shown, memory 242 memory 282 may include one or more CC configurations 1102, one or more IDs 1103, encoder logic 1104, decoder logic 1105, and combination logic 1106. CC configurations 1102 and IDs 1103 may include or correspond to CC configurations 441 and ID(s) 442, respectively. Encoder logic 1104, decoder logic 1105, and combination logic 1106 may include or correspond to encoder 437, decoder 438, and combination 439, respectively. In some aspects, encoder logic 1104, decoder logic 1105, and combination logic 1106 may include or correspond to processor(s) 430. Base station 105 may receive signals from and/or transmit signal to a UE, such as UE 115 as illustrated in FIG. 10.

Referring to FIG. 9, at block 900, the base station transmits a first channel via each entity of a plurality of entities. At block 901, the base station receives a second channel via at least one entity. At block 902, the base station performing decoding based on the received second channel.

It is noted that one or more blocks (or operations) described with reference to one of FIG. 9 may be combined with one or more blocks (or operations) of another figure. For example, one or more blocks of FIG. 9 may be combined with one or more blocks (or operations) of another of FIG. 2, 4, or 11. Additionally, or alternatively, one or more operations described above with reference to FIGS. 1-7 may be combine with one or more operations described with reference to FIG. 9.

In some aspects, techniques for communicating a channel across multiple entities of a plurality of entities may include additional aspects, such as any single aspect or any combination of aspects described below or in connection with one or more other processes or devices described elsewhere herein. In some aspects, communicating a channel across multiple entities of a plurality of entities may include an apparatus receives a channel via each entity of a plurality of entities, and combine the channel across the plurality of entities to generate a combined signal for decoding. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a first aspect, the entity includes a component carrier, a cell, or a frequency allocation.

In a second aspect, alone or in combination with the first aspect, each entity has a configuration.

In a third aspect, alone or in combination with one or more of the first through second aspects, the configuration includes bandwidth (BW), bandwidth parts (BWP)s, hybrid automatic repeat request (HARQ) processes, transmission configuration indicator (TCI) states, reference signals (RS)s, control and data channel resources, or a combination thereof.

In a fourth aspect, alone or in combination with one or more of the first through third aspects, the channel includes Physical Downlink Control Channel (PDCCH), Physical Downlink Shared Channel (PDSCH), Physical Uplink Control Channel (PUCCH), or Physical Uplink Shared Channel (PUSCH).

In a fifth aspect, alone or in combination with one or more of the first through fourth aspects, the channel of each entity of the plurality of entities has the same configuration.

In a sixth aspect, alone or in combination with one or more of the first through fourth aspects, the channel of each entity of the plurality of entities has a different configuration.

In a seventh aspect, alone or in combination with one or more of the first through sixth aspects, the channel of each entity of the plurality of entities carries the same content.

In an eighth aspect, alone or in combination with the seventh aspect, management functionalities corresponding to the plurality of entities at least include active BWP switching and beam management.

In a ninth aspect, alone or in combination with the seventh aspect, each of the plurality of entities have identical active bandwidth part (BWP) identities (IDs), and transmit (Tx)/receive (Rx) beams.

In a tenth aspect, alone or in combination with the seventh aspect, the channel of each entity of the plurality of entities carries a jointly encoded content.

In an eleventh aspect, alone or in combination with the seventh aspect, at least two entities of the plurality of entities have independent management functionalities.

In a twelfth aspect, alone or in combination with one or more of the first through eleventh aspects, the apparatus schedules another channel including Physical Downlink Shared Channel (PDSCH), Physical Uplink Control Channel (PUCCH), or Physical Uplink Shared Channel (PUSCH) for transmission over the plurality of entities.

In a thirteenth aspect, alone or in combination with the twelfth aspect, the scheduled channel on each entity of the plurality of entities is jointly encoded over the plurality of entities.

In a fourteenth aspect, alone or in combination with the thirteenth aspect, the entities have identical management functionalities.

In a fifteenth aspect, alone or in combination with the fourteenth aspect, the management functionalities at least include active BWP switching and beam management.

In a sixteenth aspect, lone or in combination with the fourteenth aspect, the entities have identical active bandwidth parts (BWP) identities (IDs), and transmit (Tx)/receive (Rx) beams.

In a seventeenth aspect, lone or in combination with the twelfth aspect, wherein the scheduled channel on each entity of the plurality of entities is individually encoded over the entity.

In an eighteenth aspect, alone or in combination with one or more of the first through seventeenth aspects, the apparatus receives a common cell identity (ID), a common bandwidth part (BWP) ID, or both for each entity of the plurality of entities.

In a nineteenth aspect, alone or in combination with the eighteenth aspect, the apparatus receives a medium access control-control element (MAC-CE), a radio resource control (RRC), or downlink control information (DCI), and the received MAC-CE, the received RRC, or the received DCI includes the common cell ID, the common BWP ID, or both.

In a twentieth aspect, alone or in combination with the nineteenth aspect, the common cell ID comprises a virtual cell ID or a cell ID corresponding to one entity of the plurality of entities.

In a twenty-first aspect, alone or in combination with one or more of the first through twentieth aspects, each entity of the plurality of entities has the same configuration.

In a twenty-second aspect, alone or in combination with the twenty-first aspect, the channel of each entity of the plurality of entities has the same configuration.

In a twenty-third aspect, alone or in combination with the twenty-first aspect, the channel of each entity of the plurality entities carries the same content.

In a twenty-fourth aspect, alone or in combination with the twenty-third aspect, the entities have identical management functionalities.

In a twenty-fifth aspect, alone or in combination with the twenty-fourth aspect, the management functionalities at least include active bandwidth part (BWP) switching and beam management.

In a twenty-sixth aspect, alone or in combination with the twenty-fifth aspect, the entities have identical active bandwidth part (BWP) identities (IDs), and transmit (Tx)/receive (Rx) beams.

In a twenty-seventh aspect, at least two entities of the plurality of entities have different configurations.

In a twenty-eighth aspect, alone or in combination with the twenty-seventh aspect, the at least two entities of the plurality of entities having different configurations have independent management functionalities.

In a twenty-ninth aspect, alone or in combination with the twenty-seventh aspect, the channels of at least two entities of the plurality of entities have the same configuration.

In a thirtieth aspect, alone or in combination with the twenty-seventh aspect, the channel of each entity of the plurality of entities carries a jointly encoded content.

In a thirty-first aspect, alone or in combination with the twenty-seventh aspect, at least two entities have independent management functionalities.

In a thirty-second aspect, alone or in combination with the thirty-first aspect, the management functionalities at least include active bandwidth part (BWP) identities (IDs), and transmit (Tx)/receive (Rx) beams.

In a thirty-third aspect, alone or in combination with the thirty-first aspect, at least two entities have independent active bandwidth part (BWP) identities (IDs), and/or transmit (Tx)/receive (Rx) beams.

In a thirty-fourth aspect, alone or in combination with the twenty-seventh aspect, the apparatus receives a common cell identity (ID) and a hybrid automatic repeat request (HARQ) ID for each entity of the plurality of entities.

In a thirty-fifth aspect, alone or in combination with the thirty-fourth aspects, claim 35, wherein the common cell ID comprises a virtual cell ID or a cell ID corresponding to one entity of the plurality of entities.

In a thirty-sixth aspect, alone or in combination with one or more of the first through thirty-fifth aspects, the plurality of entities include a coreset.

In a thirty-seventh aspect, alone or in combination with one or more of the first through thirty-fifth aspects, the plurality of entities include a subset of entities of a coreset.

In a thirty-eighth aspect, alone or in combination with one or more of the first through thirty-seventh aspects, the channel of each entity of the plurality of entities includes jointly encoded control information.

In some aspects, an apparatus configured for wireless communication, such as a base station, is configured to transmitting, by a base station, a first channel via each entity of a plurality of entities; and receiving, by the base station, a second channel via at least one entity. The apparatus is also configured to performing decoding based on the received second channel. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, operations described with reference to the apparatus may include a method for wireless communication.

In a thirty-ninth aspect, the entity includes component carrier, cell, or frequency allocation.

In a fortieth aspect, alone or in combination with the thirty-ninth aspect, each entity has a configuration.

In a forty-first aspect, alone or in combination with the fortieth aspect, the configuration includes the bandwidth (BW), bandwidth parts (BWP)s, hybrid automatic repeat request (HARQ) processes, transmission configuration indicator (TCI) states, reference signals (RS)s, control and data channel resources.

In a forty-second aspect, alone or in combination with one or more of the thirty-ninth through forty-first aspects, the channel includes Physical Downlink Control Channel (PDCCH), Physical Downlink Shared Channel (PDSCH), Physical Uplink Control Channel (PUCCH), or Physical Uplink Shared Channel (PUSCH).

In a forty-third aspect, alone or in combination with one or more of the thirty-ninth through forty-first aspects, if the channel is Physical Downlink Control Channel (PDCCH), it can schedule a channel including Physical Downlink Shared Channel (PDSCH), Physical Uplink Shared Channel (PUSCH), Physical Uplink Control Channel (PUCCH), transmitted over a plurality of entities.

In a forty-fourth aspect, alone or in combination with the forty-third aspect, the scheduled channel on each entity is jointly encoded over the plurality of entities.

In a forty-fifth aspect, alone or in combination with the forty-third aspect, the scheduled channel on each entity is individually encoded on the entity itself.

In a forty-sixth aspect, the apparatus receives a common cell identity (ID), a common bandwidth part (BWP) ID, or both for each entity of the plurality of entities.

In a forty-seventh aspect, alone or in combination with the forty-sixth aspect, the apparatus receives a medium access control-control element (MAC-CE), a radio resource control (RRC), or a downlink control information (DCI); and wherein the received MAC-CE, the received RRC, or the received DCI includes the common cell ID, the common BWP ID, or both.

In a forty-eighth aspect, alone or in combination with the forty-seventh aspect, the common cell ID comprises a virtual cell ID or a cell ID corresponding to one entity of the plurality of entities.

In a forty-ninth aspect, each entity of the plurality of entities has the same configuration.

In a fiftieth aspect, alone or in combination with the forty-ninth aspect, the channel of each entity of the plurality of entities has the same configuration.

In a fifty-first aspect, alone or in combination with the forty-ninth aspect, the channel of each entity of the plurality of entities carries the same content.

In a fifty-second aspect, alone or in combination with the fifty-first aspect, the entities have identical management functionalities.

In a fifty-third aspect, alone or in combination with the fifty-first aspect, the management functionalities at least include active bandwidth part (BWP) switching, and beam management.

In a fifty-fourth aspect, alone or in combination with the fifty-first aspect, the entities have identical active bandwidth part (BWP) identities (IDs), and transmit (Tx)/receive (Rx) beams.

In a fifty-fifth aspect, at least two entities of the plurality of entities have different configurations.

In a fifty-sixth aspect, alone or in combination with the fifty-fifth aspect, the channels of at least two entities of the plurality of entities have different configurations.

In a fifty-seventh aspect, alone or in combination with the fifty-fifth aspect, the channel of each entity of the plurality of entities carries a jointly encoded content.

In a fifty-eighth aspect, alone or in combination with the fifty-fifth aspect, at least two entities have independent management functionalities.

In a fifty-ninth aspect, alone or in combination with the fifty-eighth aspect, the management functionalities at least include active bandwidth part (BWP) switching, and beam management.

In a sixtieth aspect, alone or in combination with the fifty-eighth aspect at least two entities have independent active bandwidth part (BWP) identities (IDs), and/or transmit (Tx)/receive (Rx) beams.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 4) may comprise processors, electronics devices, hardware devices, electronics components, logical circuits, memories, software codes, firmware codes, etc., or any combination thereof. The functional blocks and modules in FIGS. 8-9 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, performed by a user equipment (UE), comprising:
   receiving a channel via each entity of a plurality of entities;
   receiving a common cell identity (ID) from each entity of the plurality of entities; and
   combining, the channel across multiple entities of the plurality of entities, from each of which the common cell ID is received, to generate a combined signal for decoding, the multiple entities comprising component carriers (CCs) grouped together into a control resource set (CORESET).

2. The method of claim 1, wherein:
   an entity of the plurality of entities includes a cell or a frequency allocation;
   each entity has a configuration; and
   at least one configuration includes bandwidth (BW), bandwidth parts (BWPs), hybrid automatic repeat request (HARQ) processes, transmission configuration indicator (TCI) states, reference signals (RSs), and control and data channel resources.

3. The method of claim 1, wherein:
   the channel includes Physical Downlink Control Channel (PDCCH), Physical Downlink Shared Channel (PDSCH), Physical Uplink Control Channel (PUCCH), or Physical Uplink Shared Channel (PUSCH); and
   the channel of each entity of the plurality of entities carries a same content.

4. The method of claim 3, wherein management functionalities corresponding to the plurality of entities at least include active BWP switching and beam management.

5. The method of claim 3, wherein each of the plurality of entities have identical active bandwidth part (BWP) identities (IDs) and transmit (Tx)/receive (Rx) beams.

6. The method of claim 3, wherein the channel of each entity of the plurality of entities carries a jointly encoded content.

7. The method of claim 3, wherein at least two entities of the plurality of entities have independent management functionalities.

8. The method of claim 1, wherein:
   the channel comprises Physical Downlink Control Channel (PDCCH), and further comprising scheduling another channel including Physical Downlink Shared Channel (PDSCH), Physical Uplink Control Channel (PUCCH), or Physical Uplink Shared Channel (PUSCH) for transmission over the plurality of entities; and
   the scheduled channel on each entity of the plurality of entities is jointly encoded over the plurality of entities.

9. The method of claim 8, wherein:
   the entities have identical management functionalities; and
   the management functionalities at least include active BWP switching and beam management.

10. The method of claim 8, wherein:
the entities have identical management functionalities; and
the entities have identical active bandwidth parts (BWP) identities (IDs) and transmit (Tx)/receive (Rx) beams.

11. The method of claim 1, wherein the multiple entities are grouped together based on the common cell ID.

12. The method of claim 1, further comprising receiving the common cell ID and a hybrid automatic repeat request (HARQ) ID for each entity of the plurality of entities.

13. The method of claim 1, wherein the common cell ID and a hybrid HARQ ID facilitate HARQ combining.

14. The method of claim 1, wherein:
the common cell ID comprises a virtual cell ID, and
an entity of the plurality of entities includes a cell and a frequency allocation.

15. An apparatus configured for wireless communication, the apparatus comprising:
at least one processor; and
a memory coupled to the at least one processor,
wherein the at least one processor is configured to:
receive a channel via each entity of a plurality of entities;
receive a common cell identity (ID) from each entity of the plurality of entities; and
combine the channel across multiple entities of the plurality of entities, from each of which the common cell ID is received, to generate a combined signal for decoding, the multiple entities comprising component carriers (CCs) grouped together into a control resource set (CORESET).

16. The apparatus of claim 15, wherein at least two entities of the plurality of entities have different configurations.

17. The apparatus of claim 16, wherein the at least two entities of the plurality of entities having different configurations have independent management functionalities.

18. The apparatus of claim 16, wherein channels of at least two entities of the plurality of entities have a same configuration.

19. The apparatus of claim 16, wherein:
at least two entities have independent management functionalities; and
the management functionalities at least include active bandwidth part (BWP) identities (IDs) and transmit (Tx)/receive (Rx) beams.

20. The apparatus of claim 16, wherein:
at least two entities have independent management functionalities; and
at least two entities have independent active bandwidth part (BWP) identities (IDs) and/or transmit (Tx)/receive (Rx) beams.

21. The apparatus of claim 16, wherein the at least one processor is further configured to:
receive a common cell identity (ID) and a hybrid automatic repeat request (HARD) ID for each entity of the plurality of entities; and
wherein the common cell ID comprises a virtual cell ID or a cell ID corresponding to one entity of the plurality of entities.

22. An apparatus configured for wireless communication, comprising:
means for receiving a channel via each entity of a plurality of entities;
means for receiving a common cell identity (ID) from each entity of the plurality of entities; and
means for combining the channel across multiple entities of the plurality of entities, from each of which the common cell ID is received, to generate a combined signal for decoding, the multiple entities comprising component carriers (CCs) grouped together into a control resource set (CORESET).

23. The apparatus of claim 22, wherein:
each entity of the plurality of entities has a same configuration; and
the channel of each entity of the plurality of entities has the same configuration and carries a same content.

24. The apparatus of claim 22, wherein the plurality of entities include a subset of entities of the CORESET.

25. The apparatus of claim 22, wherein the channel of each entity of the plurality of entity includes jointly encoded control information.

26. A non-transitory computer-readable medium having program code recorded thereon, the program code executable by a computer for causing the computer to:
receive, by a user equipment (UE), a channel via each entity of a plurality of entities;
receive, by the UE, a common cell identity (ID) from each entity of the plurality of entities; and
combine the channel across multiple entities of the plurality of entities, from each of which the common cell ID is received, to generate a combined signal for decoding, the multiple entities comprising component carriers (CCs) grouped together into a control resource set (CORESET).

27. The non-transitory computer-readable medium of claim 26, wherein:
the channel comprises Physical Downlink Control Channel (PDCCH), and further comprising scheduling another channel including Physical Downlink Shared Channel (PDSCH), Physical Uplink Control Channel (PUCCH), or Physical Uplink Shared Channel (PUSCH) for transmission over the plurality of entities; and
the scheduled channel on each entity of the plurality of entities is individually encoded over the entity.

28. The non-transitory computer-readable medium of claim 26, wherein the program code is further executable by the computer for causing the computer to receive a common cell identity (ID), a common bandwidth part (BWP) ID, or both for each entity of the plurality of entities.

29. The non-transitory computer-readable medium of claim 28, wherein the program code is further executable by the computer for causing the computer to receive a medium access control-control element (MAC-CE), a radio resource control (RRC), or downlink control information (DCI), and wherein the received MAC-CE, the received RRC, or the received DCI includes the common cell ID, the common BWP ID, or both.

30. The non-transitory computer-readable medium of claim 28, wherein the common cell ID comprises a virtual cell ID or a cell ID corresponding to one entity of the plurality of entities.

* * * * *